United States Patent [19]
Tawada et al.

[11] Patent Number: 5,144,101
[45] Date of Patent: Sep. 1, 1992

[54] CONTROL APPARATUS FOR ELEVATOR DOORS USING VELOCITY LIMITING CIRCUITS

[75] Inventors: Masanori Tawada; Masamoto Mizuno; Terumi Hirabayashi; Toshiyuki Kodera, all of Aichi, Japan

[73] Assignee: Mitsubishi Denki Kabushiki Kaisha, Japan

[21] Appl. No.: 705,928

[22] Filed: May 28, 1991

[30] Foreign Application Priority Data

May 25, 1990 [JP] Japan .................................. 2-133745

[51] Int. Cl.$^5$ ............................................. B66B 13/14
[52] U.S. Cl. .................................................. 187/103
[58] Field of Search ................. 187/103, 119; 364/513

[56] References Cited
U.S. PATENT DOCUMENTS

| | | | |
|---|---|---|---|
| 3,814,214 | 6/1974 | Booker, Jr. ........................ | 187/103 |
| 4,300,663 | 11/1981 | Hmelovsky et al. ............... | 187/103 |
| 4,982,816 | 1/1991 | Doi et al. ............................. | 187/119 |
| 4,989,174 | 1/1991 | Yasunobu et al. .................. | 364/513 |

Primary Examiner—Howard L. Williams
Assistant Examiner—Lawrence E. Colbert
Attorney, Agent, or Firm—Leydig, Voit & Mayer

[57] ABSTRACT

An apparatus for controlling elevator doors where door operation velocity is calculated based on the rotational velocity of the door driving motor. An abnormality detection circuit is provided to alert an elevator supervisor when the calculated door operation velocity exceeds a predetermined value. A velocity limiting circuit is provided to decelerate the doors when the door operation velocity exceeds the predetermined value.

9 Claims, 2 Drawing Sheets ature, and a door operation 20 velocity. For regulating the velocity of the motor 4
CONTROL APPARATUS FOR ELEVATOR DOORS USING VELOCITY LIMITING CIRCUITS

TECHNICAL FIELD

This invention relates to a control apparatus for elevator doors.

BACKGROUND OF THE INVENTION

When entering and exiting elevator cars, passengers are frequently required to move hurriedly to avoid being caught between elevator doors and to avoid having the doors close before they are able to exit or enter the elevator car.

Heretofore, a control apparatus for elevator doors, such as the one described in Japanese Publication No. 93194/87, has been proposed which includes a pulse counter for determining door positions, a velocity command circuit for supplying a velocity command based on the output of the pulse counter, and a door operation system for opening and closing the doors based on the velocity command. When the pulse counter malfunctions, this apparatus is susceptible to sudden, undesired accelerations thus causing difficulty in passenger ingress and egress.

SUMMARY OF THE INVENTION

It is an object of this invention to provide an apparatus for controlling the operation velocity of elevator doors.

It is a further object of this invention to protect against sudden acceleration of elevator doors.

These and other objects are realized by an apparatus for controlling elevator doors comprising a velocity calculation circuit for calculating the actual operation velocity of elevator doors. A timer check circuit is coupled with the velocity calculation circuit and it detects abnormalities in door opening and closing motion based on the actual operation velocity and a predetermined reference velocity. A velocity limiting circuit is coupled with the timer check circuit and it decelerates the elevator doors when abnormalities are detected by the timer check circuit.

An advantage of this invention is that it prevents elevator doors from closing before the passengers can exit the elevator car.

Further objects and advantages of the invention will become apparent from the following description of the illustrated embodiment when taken in conjunction with the drawings.

DESCRIPTION OF THE ILLUSTRATED EMBODIMENT

Figure 1:
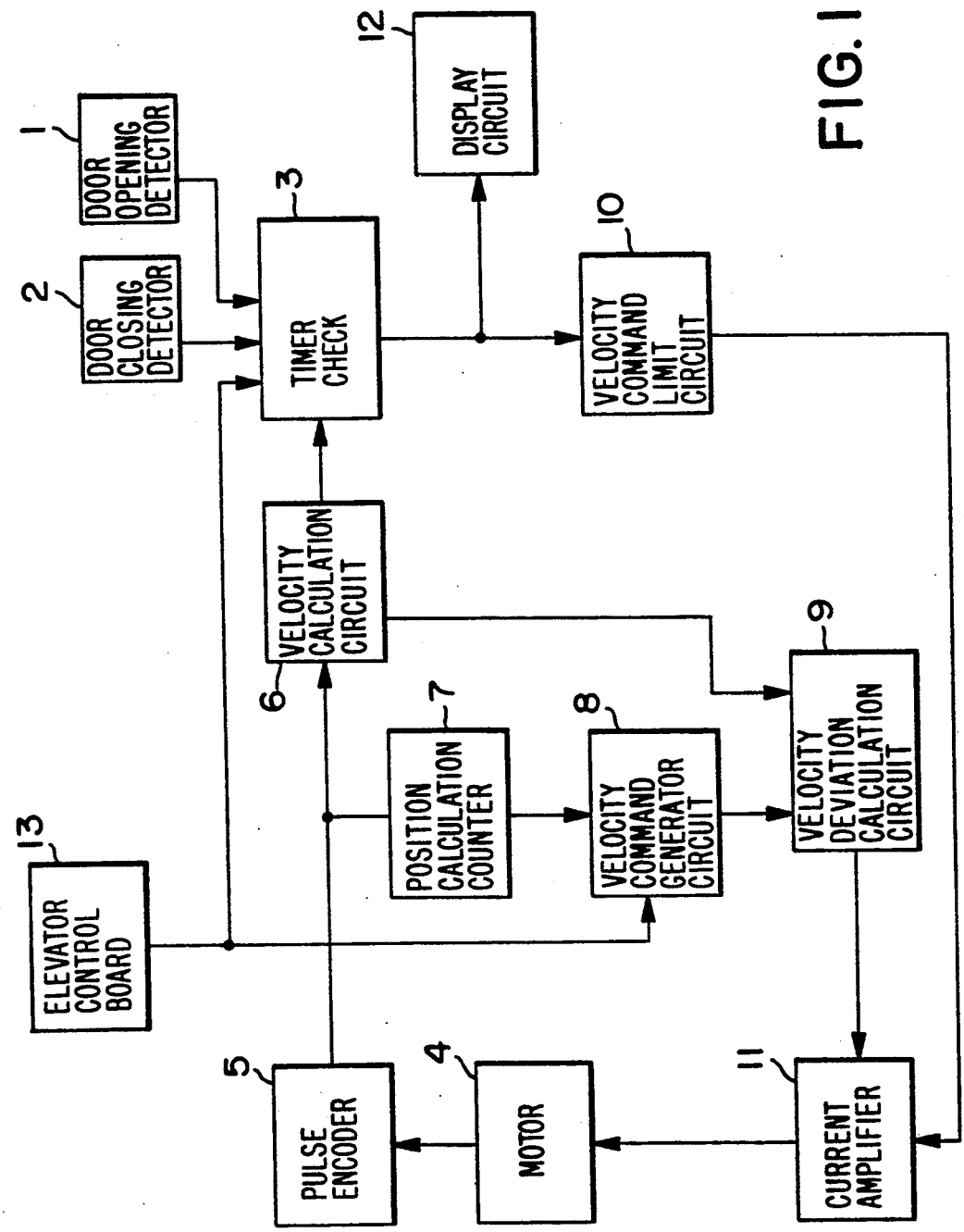
FIG. 1 is a block diagram of a control apparatus for elevator doors according to the present invention.

Referring now to FIG. 1, there is shown a control apparatus for elevator doors according to this invention. A motor 4 is provided for driving the doors. A pulse encoder 5 is connected to motor 4 and supplies pulses to velocity calculation circuit 6 which are proportional to the number of motor rotations thus enabling the velocity calculation circuit 6 to calculate actual door operation velocity. For limiting door operation velocity and detecting door abnormalities, a door opening detector 1 and a door closing detector 2 are depicted connected to a timer check circuit 3. Also, the velocity calculation circuit 6 and an abnormality display means 12 are connected to a timer check circuit 3 which determines door abnormalities. A velocity command limit circuit 10 is connected to the timer check circuit 3 to limit door operation velocities based on detected abnormalities. To generate door operation velocity commands, a velocity command generating circuit 8 is connected to a pulse encoder 5 via a position calculation circuit 7. A velocity deviation calculation circuit 9 is connected to the velocity calculation circuit 6 and the velocity command generating circuit 8 for determining any deviation between the actual door operation velocity and the door operation command velocity. For regulating the velocity of the motor 4 such that the doors travel at a safe velocity, a current amplifier 11 is connected to the velocity command limit circuit 10 and velocity deviation calculation circuit 9.

By way of operation, a door opening or closing command is generated at an elevator control board 13. The door opening detector 1 determines when the door is completely opened while the door closing detector 2 determines when the door is completely closed. The timer check circuit 3 measures the time period between when the door opening or closing command is generated and the door opening detector or the door closing detector determines that the door is completely opened or completely closed. The timer check circuit 3 selects a velocity at a fixed time, e.g., during a period of deceleration of the elevator doors, and compares the selected velocity with a predetermined check velocity. An abnormality in the door operation velocity will be registered in the timer check circuit 3 if the measured door operation velocity is greater than the predetermined check velocity. The timer check circuit 3 is reset by the door opening detector 1 or the door closing detector 2.

The pulse encoder 5 supplies output pulses to the velocity calculation circuit 6 which are proportional to the number of rotations of the motor 4. The velocity calculation circuit 6 determines the motor rotational velocity based on the number of pulses supplied by pulse encoder 5. From the motor rotation velocity, the velocity calculation circuit 6 calculates a door operation velocity after a fixed time.

The position calculation counter 7 determines the position of the doors based on the pulses output from the pulse encoder 5. The velocity command generator circuit 8 supplies a velocity command for door operation based on the door position determined by the position calculation counter 7. The velocity deviation calculation circuit 9 calculates the deviation between the actual door operation velocity and the velocity command value. To prevent the door operation velocity from exceeding a safe level, the velocity command limit circuit 10 supplies a certain limit value based on the output of the timer check circuit 3 to limit the door operation velocity. That is, when the timer check circuit 3 determines that the door opening and closing motion is abnormal, the velocity command limit circuit 10 quickly reduces the door operation velocity and opens and closes a door to test for proper operation at low velocity. The current amplifier 11 supplies a signal to activate the motor 4 which in turn causes the door operation velocity to change by an amount equivalent to the deviation value as long as the door operation velocity does not exceed the limit value. Otherwise, the door operation velocity is decreased until it equals the limit value. The abnormality display circuit 12 is connected to the timer check circuit 3 and it displays abnormalities to inform the elevator room supervisor when the rotational velocity of the motor 4 exceeds a predetermined reference velocity.

Figure 2A:
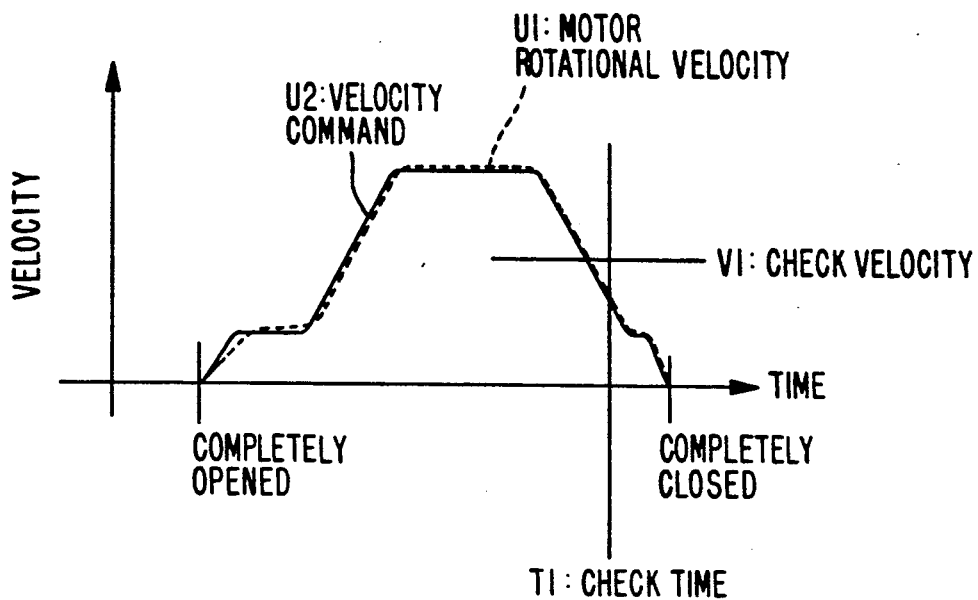
FIG. 2(a) is a graph of the relationship between velocity and time during the normal door closing operation.
Figure 2B:
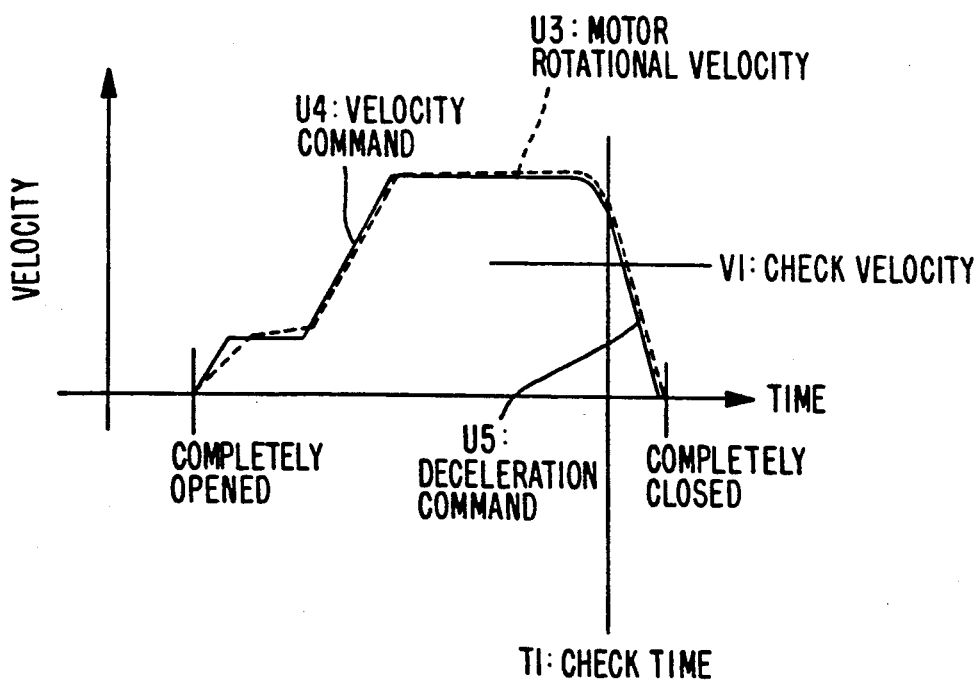
FIG. 2(b) is a graph of the relationship between velocity and time during the abnormal door closing operation.

Referring now to FIG. 2, FIG. 2(a) describes a normal door closing operation, and FIG. 2(b) describes an abnormal door closing operation.

In a conventional apparatus, when a present door operation position is not ascertainable due to trouble with the position calculation counter 7, the door running velocity command $V_4$ is generated as an abnormal command of the velocity command generator circuit 8. This command is generated based on a count value of the position calculation counter 7. In this case, entry and exit from the elevator car can be very dangerous for a passenger because the motor rotational velocity is greater than the reference velocity during most of the door opening and closing operation. Therefore, the door operation velocity does not begin to decrease until the door is almost completely closed. However, in this apparatus, the motor rotational velocity is compared with a check velocity at check time $T_1$. Therefore, the timer check circuit 3 can determine whether the door opening and closing motion is abnormal by comparing the motor rotational velocity to the check velocity $V_1$. In the presence of an abnormality (where the check velocity is less than the motor rotational velocity as in FIG. 2(b)), the velocity command limit circuit 10 reduces the door operation velocity by supplying a rapid deceleration command $V_5$ to the motor 4 and the abnormality display circuit displays an abnormality. Under normal conditions the timer check circuit 3 determines that the door opening and closing motion is not abnormal because the value of the motor rotational velocity is lower than the value of the check velocity $V_1$, as in FIG. 2(a).

The illustrated embodiment having been described, it should be noted that numerous variations, modifications and other embodiments will become apparent to a person having ordinary skill in the art.

We claim:

1. An apparatus for controlling elevator doors comprising:
    a velocity calculation circuit for calculating actual operation velocity of elevator doors;
    a timer check circuit coupled with said velocity calculation circuit for detecting abnormalities in door opening and closing motion based on the actual operation velocity and a predetermined reference velocity; and
    a velocity command limiting circuit coupled with said timer check circuit for decelerating the elevator doors based on detection of abnormalities by said timer check circuit.

2. An apparatus for controlling elevator doors according to claim 1 where said timer check circuit generates an output representative of a comparison between the actual door operating velocity selected at a predetermined time and a reference velocity selected at the same predetermined time.

3. An apparatus for controlling elevator doors according to claim 2 where said velocity command limiting circuit generates an output representative of a limit value for door operation velocity based on the output generated by said timer check circuit.

4. An apparatus for controlling elevator doors according to claim 3 further comprising a motor for driving the elevator doors.

5. An apparatus for controlling elevator doors according to claim 4 further comprising a current amplifier coupled to said motor and said velocity command limiting circuit which transmits a deceleration command to said motor when an abnormality is detected.

6. An apparatus for controlling elevator doors according to claim 1 further comprising an abnormality display circuit for displaying an abnormality when the actual operation velocity is greater than the predetermined reference velocity.

7. An apparatus for controlling elevator doors comprising:
    a velocity calculation circuit for calculating actual door operation velocity;
    a velocity command circuit for generating a door operation velocity command;
    a motor for driving the elevator doors;
    a timer check circuit coupled with said velocity calculator circuit for detecting abnormalities in elevator door opening and closing motion based on the actual operation velocity and a predetermined reference velocity, both velocities being measured at a point of deceleration of the elevator doors;
    a velocity deviation calculation circuit coupled with said velocity command circuit and said velocity calculation circuit for calculating the deviation between the door operation command velocity and the actual door operation velocity;
    a velocity command limit circuit for generating a signal representative of the limit value for the door operating velocity;
    a current amplifiers for driving said motor connected to said velocity deviation calculation circuit and said velocity command limit circuit so that said actual door velocity is adjusted to said command velocity when no abnormalities are detected and said actual door velocity is adjusted to the limit velocity when abnormalities are detected.

8. An apparatus for controlling elevator doors according to claim 1 further comprising an abnormality display means for displaying an abnormality when the rotational velocity of said motor is greater than the predetermined reference velocity.

9. An apparatus for controlling elevator doors comprising:
    a velocity calculation circuit for calculating actual operation velocity of elevator doors;
    a timer check circuit coupled with said velocity calculation circuit for comparing the actual operation velocity with a reference velocity measured at a predetermined check time independent of door position and generating an abnormality signal when the actual velocity exceeds the reference velocity;
    a velocity limiting circuit coupled with said timer check circuit for generating a maximum velocity command signal responsive to the abnormality signal generated by said timer check circuit which clips the actual operation velocity of the elevator doors at a predetermined level.

* * * * *